United States Patent
Lin

(10) Patent No.: US 9,664,852 B1
(45) Date of Patent: May 30, 2017

(54) OPTICAL WAVEGUIDE HAVING SEVERAL DIELECTRIC LAYERS AND AT LEAST ONE METAL CLADDING LAYER

(71) Applicant: NANYA TECHNOLOGY CORPORATION, Taoyuan (TW)

(72) Inventor: Po-Chun Lin, Changhua County (TW)

(73) Assignee: NANYA TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 15/281,102

(22) Filed: Sep. 30, 2016

(51) Int. Cl.
  *G02B 6/10* (2006.01)
  *G02B 6/122* (2006.01)
  *H01P 3/12* (2006.01)
  *G02B 6/12* (2006.01)

(52) U.S. Cl.
  CPC ............. *G02B 6/122* (2013.01); *H01P 3/122* (2013.01); *G02B 2006/12038* (2013.01); *G02B 2006/12061* (2013.01)

(58) Field of Classification Search
  None
  See application file for complete search history.

(56) References Cited

U.S. PATENT DOCUMENTS

| | | | | |
|---|---|---|---|---|
| 3,563,630 A | * | 2/1971 | Anderson | G02B 6/122 250/227.11 |
| 4,463,330 A | * | 7/1984 | Yoneyama | H01P 3/165 333/239 |
| 5,093,883 A | * | 3/1992 | Yoon | G02F 1/065 385/130 |
| 5,123,078 A | * | 6/1992 | Thomas | G02B 6/43 385/129 |
| 5,887,116 A | * | 3/1999 | Grote | G02F 1/065 385/122 |
| 6,775,453 B1 | * | 8/2004 | Hornbeck | G02B 6/122 385/129 |
| 6,954,561 B1 | * | 10/2005 | Khan | G02F 1/0147 385/129 |
| 7,295,725 B1 | * | 11/2007 | Wu | G02B 6/12 385/129 |
| 2003/0169133 A1 | * | 9/2003 | Torigoe | H01P 3/06 333/238 |
| 2006/0210216 A1 | * | 9/2006 | Lee | G02B 6/12002 385/14 |
| 2012/0148183 A1 | * | 6/2012 | Heaton | G02F 1/0136 385/2 |

(Continued)

FOREIGN PATENT DOCUMENTS

JP 2-90108 A * 3/1990
JP 10-282351 A * 10/1998

*Primary Examiner* — Mike Stahl
(74) *Attorney, Agent, or Firm* — CKC & Partners Co., Ltd.

(57) ABSTRACT

A waveguide including a substrate, a plurality of cladding layers, a first dielectric layer, a second dielectric layer, and a third dielectric layer. The cladding layers are present on the substrate and define at least one tunnel therein, in which at least one of the cladding layers is made of metal. The first dielectric layer is disposed in the tunnel and has a first refractive index N1. The second dielectric layer is disposed in the tunnel and has a second refractive index N2. The third dielectric layer is disposed in the tunnel and has a third refractive index N3, and N2>N1 and N2>N3, in which the second dielectric layer is present between the first and third dielectric layers.

14 Claims, 13 Drawing Sheets

(56) References Cited

U.S. PATENT DOCUMENTS

2015/0188280 A1* 7/2015 Hill ................. H01S 5/1046
372/7
2015/0295297 A1* 10/2015 Cook ................ H01P 3/122
333/239

* cited by examiner

US 9,664,852 B1

OPTICAL WAVEGUIDE HAVING SEVERAL DIELECTRIC LAYERS AND AT LEAST ONE METAL CLADDING LAYER

BACKGROUND

Technical Field

The present disclosure relates to a waveguide.

Description of Related Art

With a development of the data processing, the data transmission speed of a bus has gradually fallen behind the data calculation speed of a central processing unit (CPU). Therefore, an optical signal transmission has been implemented for speeding the data transmission speed. In addition, the optical signal transmission has substantially higher bandwidth in comparison to electrical signal transmission. In an optical transmission system, electrical signals representing binary data are converted into optical signals. The optical signals are transmitted through an optical channel to an optical receiver and converted back to electrical signals. Performance of the optical signal transmission in the optical channel may affect the transmission efficiency of the data transmission.

SUMMARY

An aspect of the present disclosure provides a waveguide including cladding layers and dielectric layers, in which the dielectric layers are disposed in a tunnel defined by of the cladding layers. In a combination of the dielectric layers, the dielectric layer which has the greatest refractive index is referred to as a core layer. With decreasing gradient of the refractive indexes from the core layer, horizontal component of a traveling direction of a light beam traveling in the waveguide is increased, and this horizontal component is parallel with an axis of tunnel. Accordingly, the transmission efficiency of the waveguide is enhanced.

An aspect of the present disclosure provides a waveguide including a substrate, a plurality of cladding layers, a first dielectric layer, a second dielectric layer, and a third dielectric layer. The cladding layers are present on the substrate and define at least one tunnel therein, in which at least one of the cladding layers is made of metal. The first dielectric layer is disposed in the tunnel and has a first refractive index N1. The second dielectric layer is disposed in the tunnel and has a second refractive index N2. The third dielectric layer is disposed in the tunnel and has a third refractive index N3, and N2>N1 and N2>N3, in which the second dielectric layer is present between the first and third dielectric layers.

DETAILED DESCRIPTION

Figure 1A:
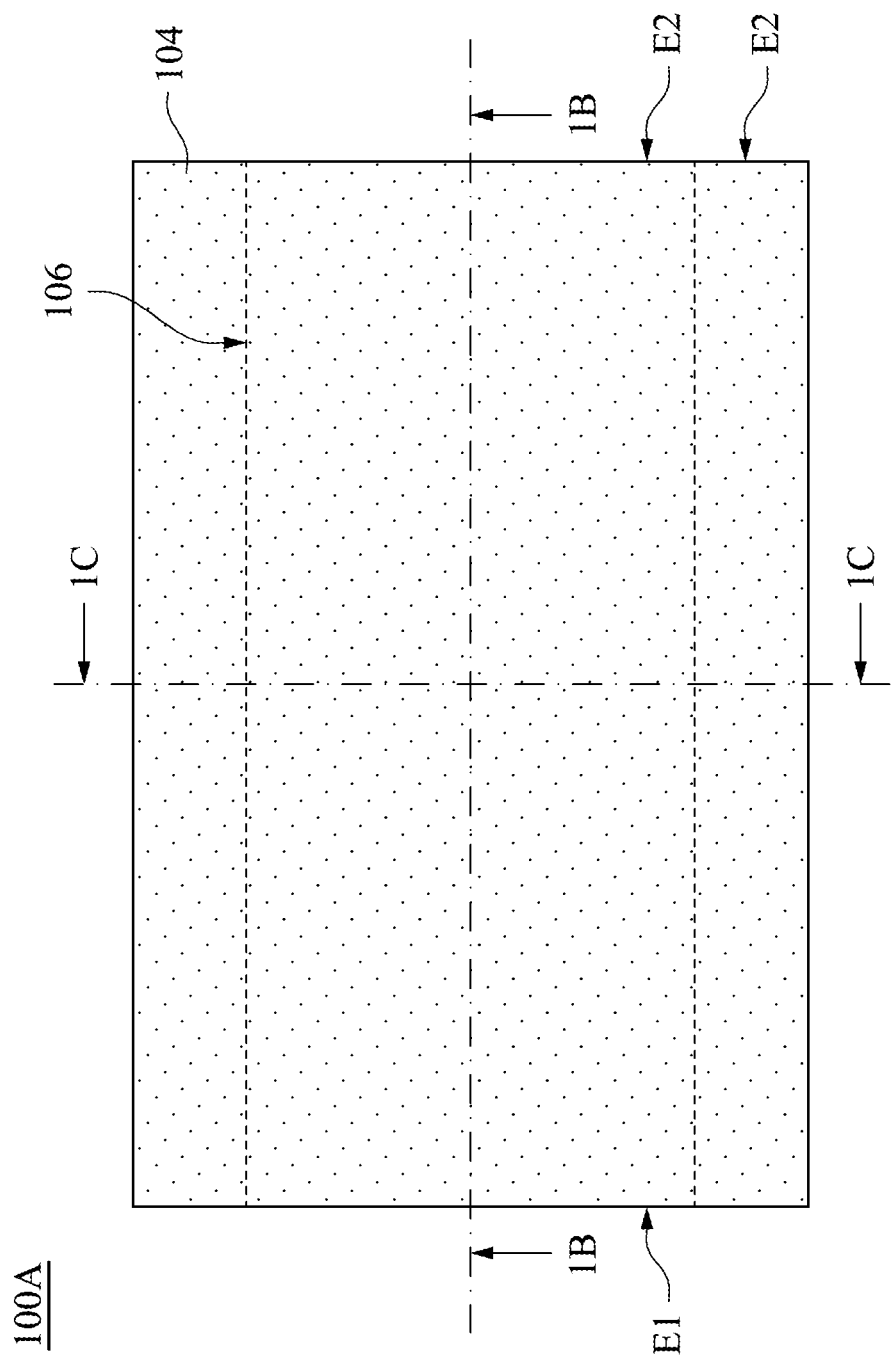
FIG. 1A is a top view of a waveguide according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It will be understood that, although the terms first, second, third etc. may be used herein to describe various elements, components, regions, layers and/or sections, these elements, components, regions, layers and/or sections should not be limited by these terms.

Figure 1B:
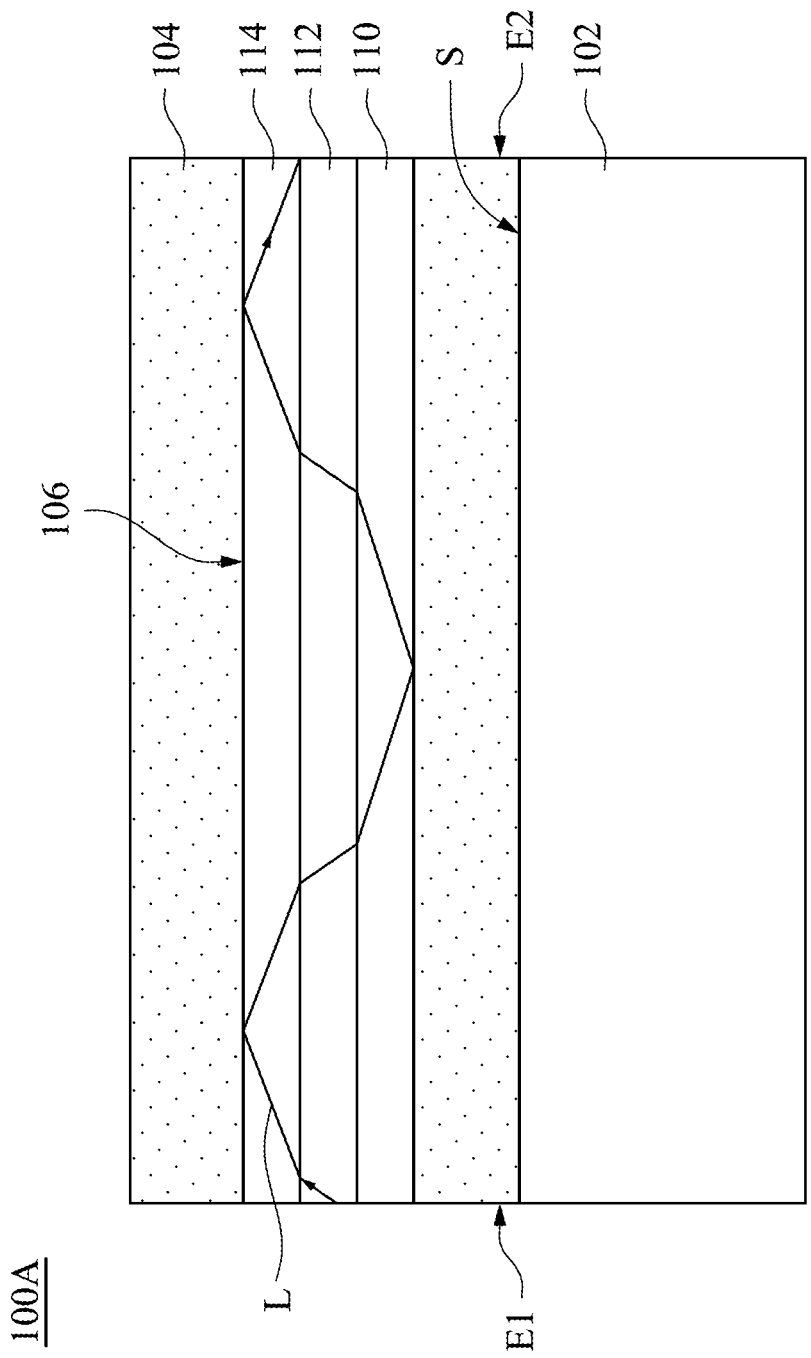
FIG. 1B is a cross-sectional view in FIG. 1A taken along line 1B-1B.
Figure 1C:
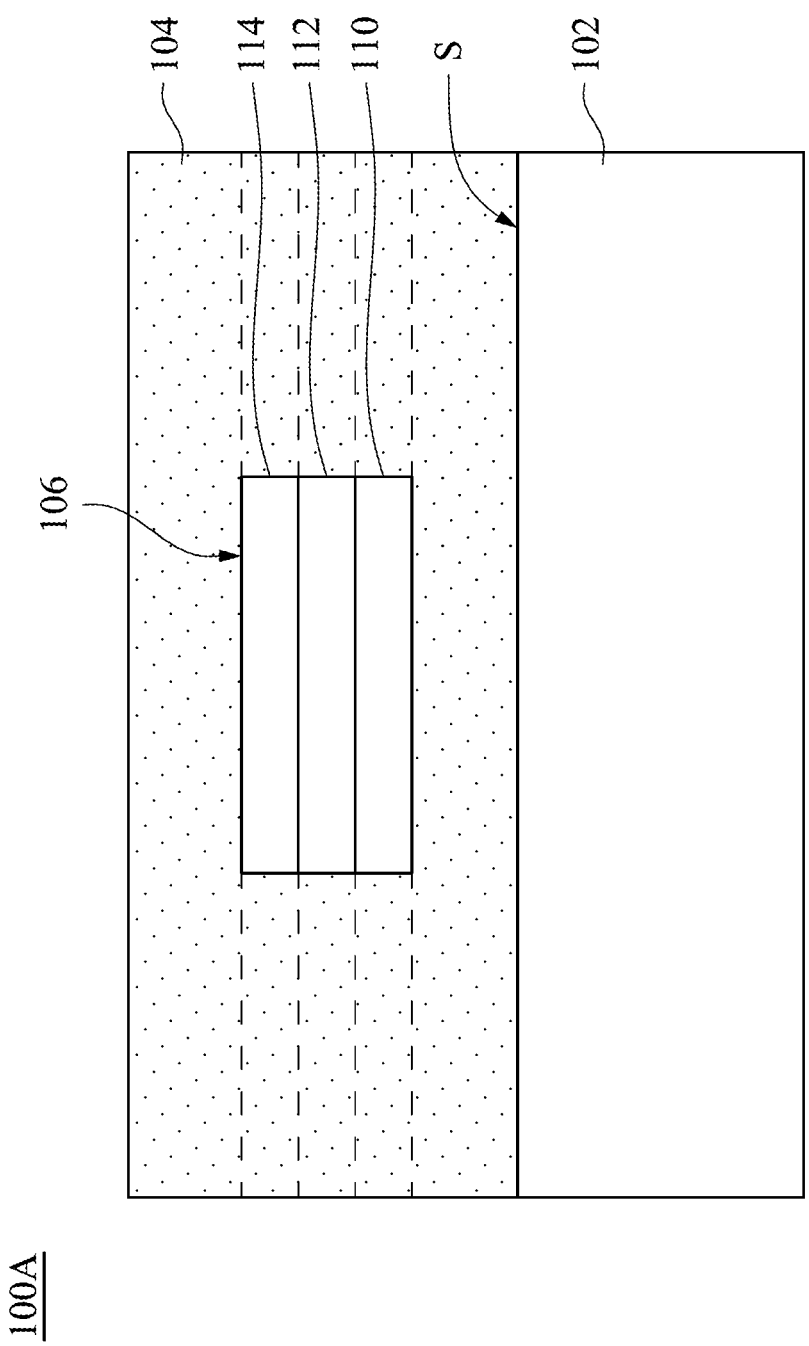
FIG. 1C is a cross-sectional view in FIG. 1A taken along line 1C-1C.

FIG. 1A is a top view of a waveguide 100A according to a first embodiment of the present disclosure, FIG. 1B is a cross-sectional view in FIG. 1A taken along line 1B-1B, and FIG. 1C is a cross-sectional view in FIG. 1A taken along line 1C-1C. As shown in FIGS. 1A, 1B, and 1C, the waveguide 100A can be configured to transmit an optical signal, such as light beams. The waveguide 100A includes a substrate 102, cladding layers 104, a first dielectric layer 110, a second dielectric layer 112, and a third dielectric layer 114, in which the substrate 102 can consist of silicon, and the dielectric layers 110, 112 and 114 can be made of silicon dioxide or transparent material. In addition, the cladding layers 104 in FIGS. 1A, 1B, and 1C are illustrated with dots.

The cladding layers 104 are disposed on the substrate 102, in which at least one of the cladding layers 104 is made of metal. The cladding layers 104 can define at least one tunnel 106 therebetween, as shown in FIG. 1C, in which interfaces among the cladding layers 104 are shown as dot lines. In some embodiments, there exists a distinguishable interface between adjacent two of the cladding layers 104. In alternative embodiments, the adjacent two of the cladding layers 104 may be merged with no distinguishable interface therebetween. The cladding layers 104 can serve as reflection layers to reflect light beams traveling in the tunnel 106. The tunnel 106 has an extending direction, and the extending direction of the tunnel 106 is substantially parallel with a surface S of the substrate 102 proximal to the cladding layers 104.

The first dielectric layer 110, the second dielectric layer 112, and the third dielectric layer 114 are disposed in the tunnel 106. The second dielectric layer 112 is joined with the first dielectric layer 110 and the third dielectric layer 114 is joined with on the second dielectric layer 112, in which the second dielectric layer 112 is disposed between the first dielectric layer 110 and the third dielectric layer 114. Thus, a combination of the first dielectric layer 110, the second dielectric layer 112, and the third dielectric layer 114 is a stacked structure. In addition, vertical projections of the first dielectric layer 110, the second dielectric layer 112, and the third dielectric layer 114 on the substrate 102 can be the same. In other words, the vertical projections of the first dielectric layer 110, the second dielectric layer 112, and the third dielectric layer 114 on the substrate 102 coincide and have the same shape and size.

As shown in FIGS. 1B and 1C, the combination of the dielectric layers (i.e. the dielectric layers disposed in the tunnel 106) is embedded in the combination of the cladding layers 104, such that the combination of the dielectric layers is in contact with the cladding layers 104. In this regard, the first dielectric layer 110 and third dielectric layer 114 are respectively in contact with the cladding layers 104 made of metal.

The combination of the dielectric layers extends from a first edge E1 to a second edge E2 of the combination of the cladding layers 104, in which the first edge E1 and the second edge E2 are opposite to each other. The first dielectric layer 110, the second dielectric layer 112, and the third dielectric layer 114 respectively have a first refractive index N1, a second refractive index N2, and a third refractive index N3, in which N2>N1 and N2>N3. Under this configuration, when an optical signal is transmitted from the first edge E1 to the second edge E2 of the combination of the cladding layers 104, the number of the reflections of the optical signal can be decreased. The mechanism that decreasing the number of the reflections of the optical signal is described below.

As shown in FIG. 1B, the optical signal is labeled as a light beam L. In some embodiments, the light beam L can be emitted from an emitter (not illustrated) disposed at the first edge E1 of the combination of the cladding layers 104. In addition, the second refractive index N2 of the second dielectric layer 112 may be designed to optically match a refractive index of a medium (not illustrated) disposed outside of the combination of the cladding layers 104.

The light beam L can travel from the first edge E1 to the second edge E2 through the first dielectric layer 110, the second dielectric layer 112, and the third dielectric layer 114, and it can be reflected by the cladding layers 104. An exemplary optical path of the light beam L illustrated in FIG. 1B. The light beam L travels from the second dielectric layer 112 toward the third dielectric layer 114. Once the light beam L travels from the second dielectric layer 112 to one of the first dielectric layer 110 and the third dielectric layer 114, a refraction of the light beam L may occur at an interface therebetween, in which the angle of incidence is smaller than the angle of refraction due to N2>N1 and N2>N3. In addition, in the combination of the dielectric layers, the second dielectric layer 112 which has the greatest refractive index can be referred to as a core layer therein.

In such situations, since the angle of incidence is smaller than the angle of refraction, the horizontal component of the traveling direction of the light beam L which is parallel to a surface S of the substrate 102 is increased. As the horizontal component of the traveling direction of the light beam L is increased, the optical path of the light beam L transmitted from the first edge E1 to the second edge E2 can be shortened, and the number of the reflections of the light beam L with respect to the combination of the cladding layers 104 is decreased. On the other hand, as the horizontal component of the traveling direction of the light beam L is increased, a ratio of the valid path to the total path of the light beam L is increased, in which the phrase "valid path" means the horizontal component of the travel of the light beam L in the waveguide 100A. Accordingly, the transmission efficiency of the waveguide 100A is enhanced.

In the following embodiments, descriptions are provided with respect to variations of the arrangement of the dielectric layers, and aspects of the above embodiments that are the same are not described again.

Figure 2:
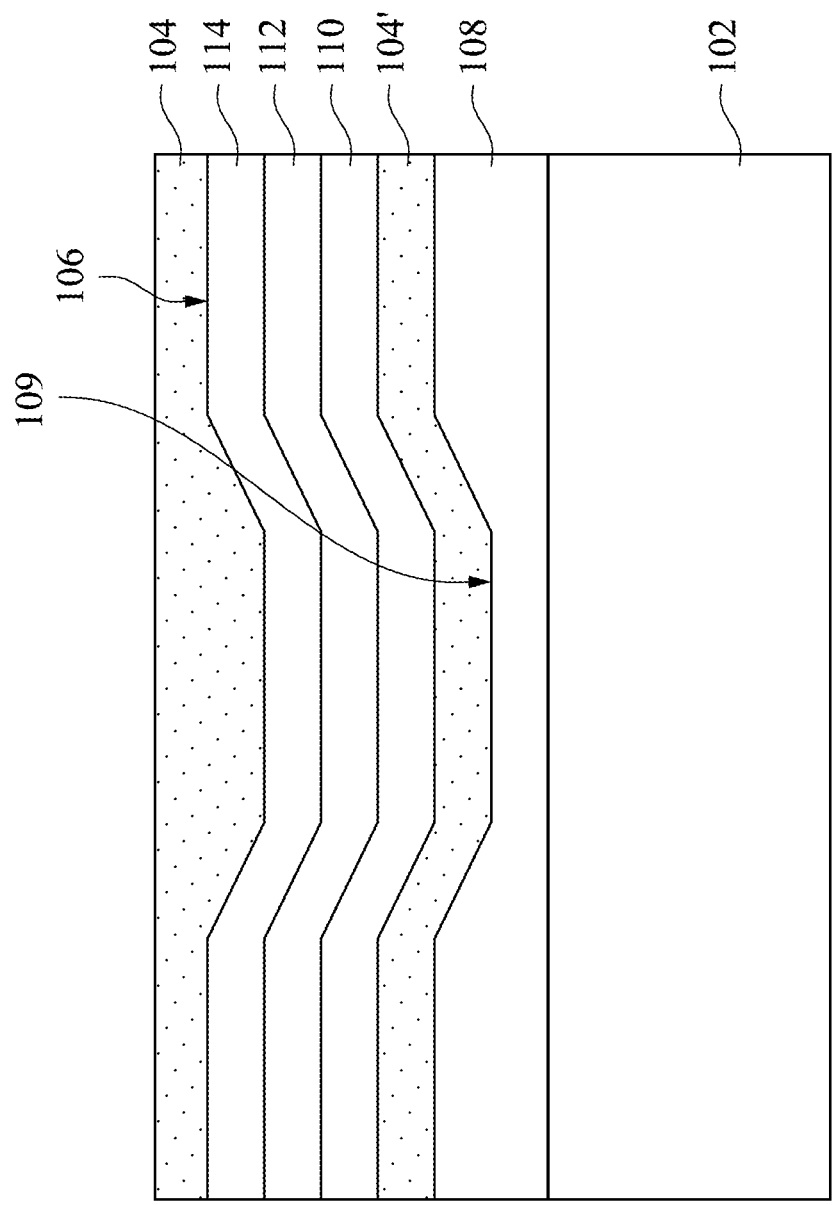
FIG. 2 is a cross-sectional view of a waveguide with the same cross-section as FIG. 1B according to a second embodiment of the present disclosure.

FIG. 2 is a cross-sectional view of a waveguide 100B with the same cross-section as FIG. 1B according to a second embodiment of the present disclosure. The difference between the present embodiment and the first embodiment is that the waveguide 100B of the present embodiment further includes an insulator layer 108. The insulator layer 108 is disposed between the substrate 102 and one of the cladding layers 104, such as the cladding layer 104', in which the insulator layer 108 is in contact with the substrate 102 and the cladding layer 104'. The insulator layer 108 has a concave 109 that receives a portion of the cladding layer 104'.

As shown in FIG. 2, a combination of the first dielectric layer 110, the second dielectric layer 112, and the third dielectric layer 114 is disposed in the tunnel 106 and above the insulator layer 108. Since the existence of the concave 109 of the insulator layer 108, the shape of the combination of the cladding layers 104 and the tunnel 106 may be varied. For example, the tunnel 106 in the first embodiment can be referred to as a straight tunnel, and the tunnel 106 in the present embodiment can be referred to as a broken-line-shaped tunnel. Accordingly, the shape of the combination of the dielectric layers disposed in the tunnel 106 may be varied as well. For example, a portion of the first dielectric layer 110 protrudes toward the substrate 102, and the second dielectric layer 112 and third dielectric layer 114 are conformal to the first dielectric layer 110. Thus, the combination of the dielectric layers in the first embodiment can be referred to as a straight channel, and the combination of the dielectric layers in the present embodiment can be referred to as a broken-line-shaped channel.

Figure 3:
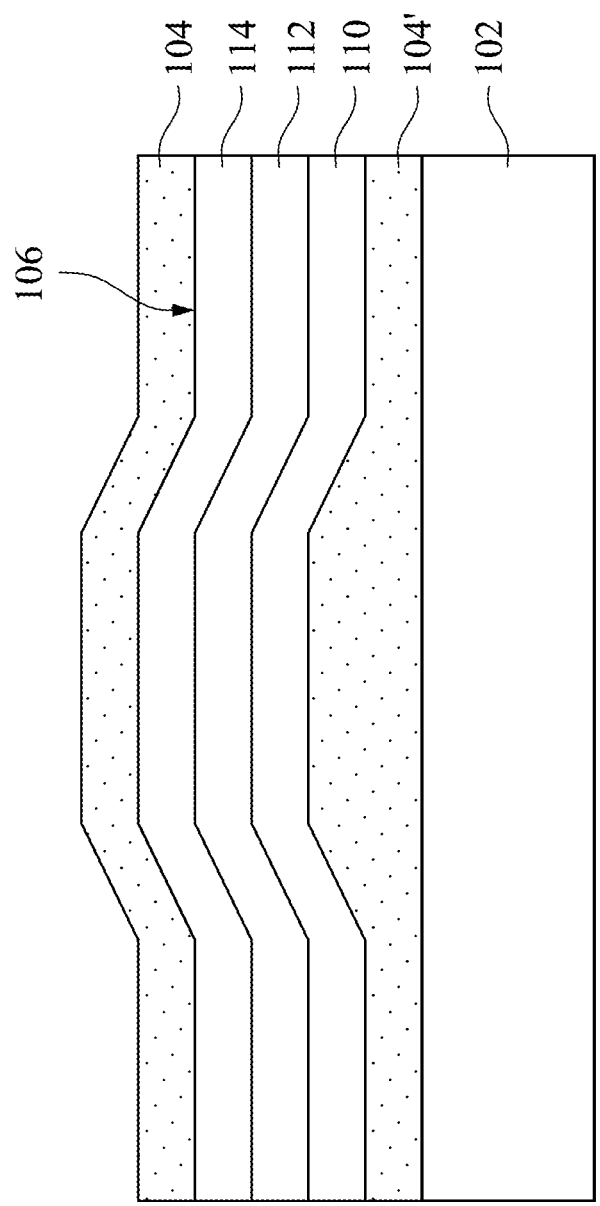
FIG. 3 is a cross-sectional view of a waveguide with the same cross-section as FIG. 1B according to a third embodiment of the present disclosure.

FIG. 3 is a cross-sectional view of a waveguide 100C with the same cross-section as FIG. 1B according to a third embodiment of the present disclosure. The difference between the present embodiment and the first embodiment is that one of the cladding layers 104 of the present embodiment protrudes toward the tunnel 106 and away from the substrate 102, such as the cladding layer 104', in which the cladding layer 104' is present between the substrate 102 and the first dielectric layer 110.

As shown in FIG. 3, since the cladding layer 104' protrudes toward the tunnel 106 and away from the substrate 102, the shape of the combination of the dielectric layers disposed in the tunnel 106 may be varied. For example, a portion of the first dielectric layer 110 protrudes away from the substrate 102, and the second dielectric layer 112 and third dielectric layer 114 are conformal to the first dielectric layer 110. Thus, the combination of the dielectric layers in the present embodiment can be referred to as a broken-line-shaped channel.

Figure 4:
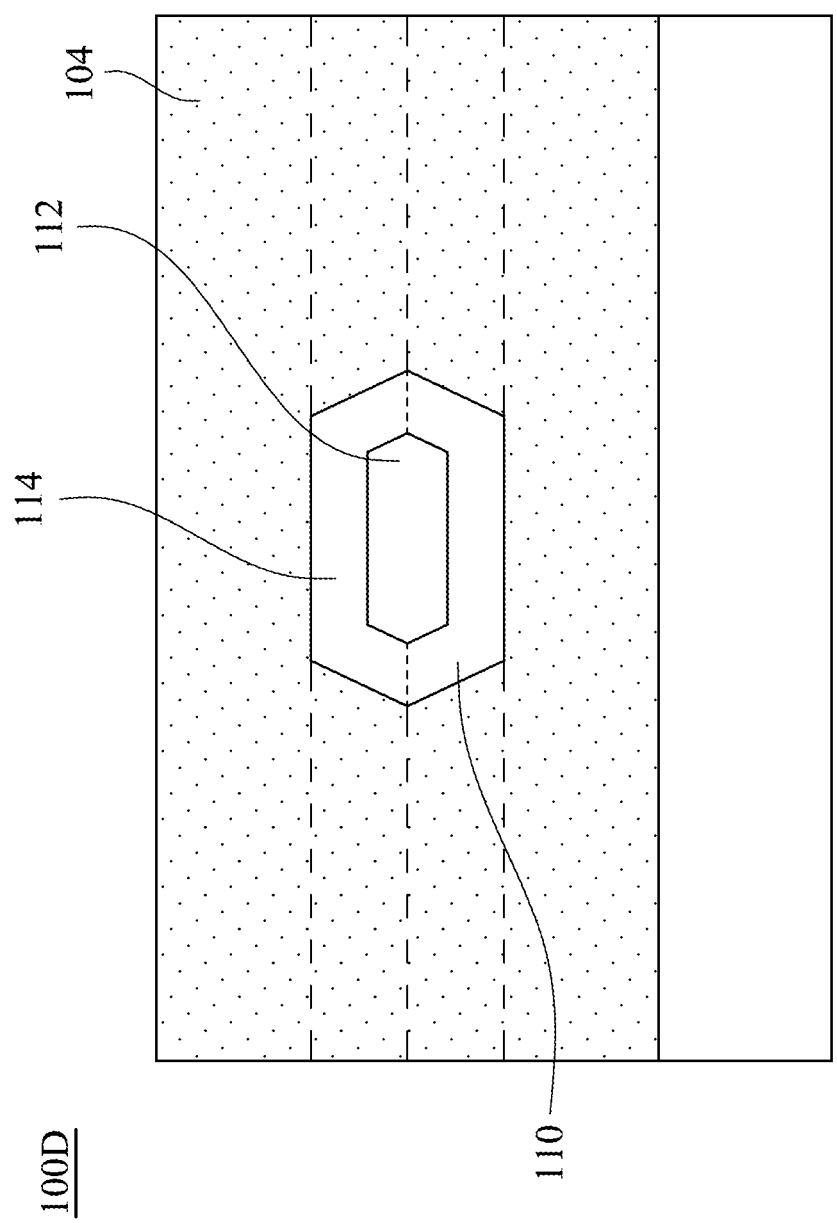
FIG. 4 is a cross-sectional view of a waveguide with the same cross-section as FIG. 1C according to a fourth embodiment of the present disclosure.

FIG. 4 is a cross-sectional view of a waveguide 100D with the same cross-section as FIG. 1C according to a fourth embodiment of the present disclosure. The difference between the present embodiment and the first embodiment is that the combination of the dielectric layers of the waveguide 100D is formed in an annular shape.

As shown in FIG. 4, the first dielectric layer 110 and the third dielectric layer 114 are connected with each other, in which an interface between the first dielectric layer 110 and the third dielectric layer 114 is shown as dot lines. In some embodiments, there exists a distinguishable interface between the first and third dielectric layers 110 and 114. In alternative embodiments, the first and third dielectric layers 110 and 114 may be merged with no distinguishable interface therebetween. In the combination of the dielectric layers, the second dielectric layer 112 is surrounded by the first dielectric layer 110 and the third dielectric layer 114, and thus the side surfaces of the second dielectric layer 112 are totally covered with the dielectric layers which have the lower refractive indexes than that of the second dielectric layer 112. Under this configuration, the second dielectric layer 112 can be referred to as a core channel therein.

Figure 5:
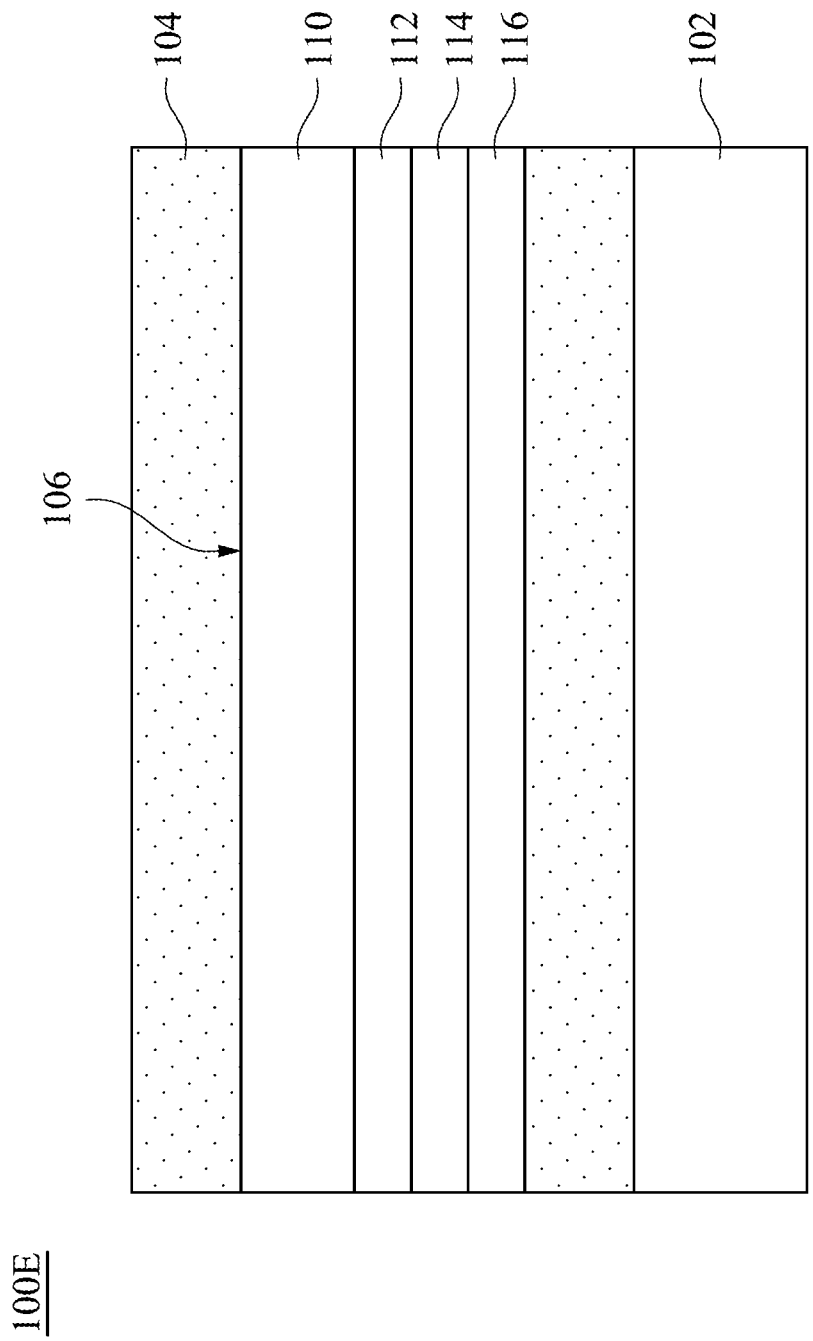
FIG. 5 is a cross-sectional view of a waveguide with the same cross-section as FIG. 1B according to a fifth embodiment of the present disclosure.

FIG. 5 is a cross-sectional view of a waveguide 100E with the same cross-section as FIG. 1B according to a fifth embodiment of the present disclosure. The difference between the present embodiment and the first embodiment is that the waveguide 100E further includes a fourth dielectric layer 116 disposed in the tunnel 106 and joined with the third dielectric layer 114, in which the third dielectric layer 114 is present between the second dielectric layer 112 and fourth dielectric layer 116. The fourth dielectric layer 116 has a fourth refractive index N4, in which N2>N3>N4, and the second dielectric layer 112 is referred to as the core layer. The dielectric layers disposed above the substrate 102 are the fourth dielectric layer 116, the third dielectric layer 114, the second dielectric layer 112, and the first dielectric layer 110 in sequence, in which the fourth dielectric layer 116 is the closest one to the substrate 102 and the fourth dielectric layer 116 is located between the substrate 102 and the third dielectric layer 114.

Similarly to the first embodiment, the vertical projections of the first dielectric layer 110, the second dielectric layer 112, and the third dielectric layer 114 and a vertical projection of the fourth dielectric layer 116 on the substrate 102 are the same, and a combination of the first dielectric layer 110, the second dielectric layer 112, the third dielectric layer 114, and the fourth dielectric layer 116 is embedded in the combination of the cladding layers 104. Furthermore, the first dielectric layer 110 and fourth dielectric layer 116 are respectively in contact with the cladding layers 104 made of metal.

In the present embodiment, a relationship among the first refractive index N1, the second refractive index N2, the refractive index N3, and the fourth refractive index N4 is that N2>N1 and N2>N3>N4, and therefore the horizontal component of the traveling direction of the light beam L (see FIG. 1A) is increased, thereby increasing the ratio of the valid path to the total path of the light beam L (see FIG. 1A) as well.

Furthermore, the combination of the dielectric layers can be an asymmetric structure. For example, the first dielectric layer 110 has a thickness which is greater than thicknesses of the second dielectric layer 112, the third dielectric layer 114, and the fourth dielectric layer 116. In addition, in some embodiments, at least one of the first dielectric layer 110, the second dielectric layer 112, the third dielectric layer 114, and the fourth dielectric layer 116 has a thickness different from that of others of the dielectric layers.

Figure 6:
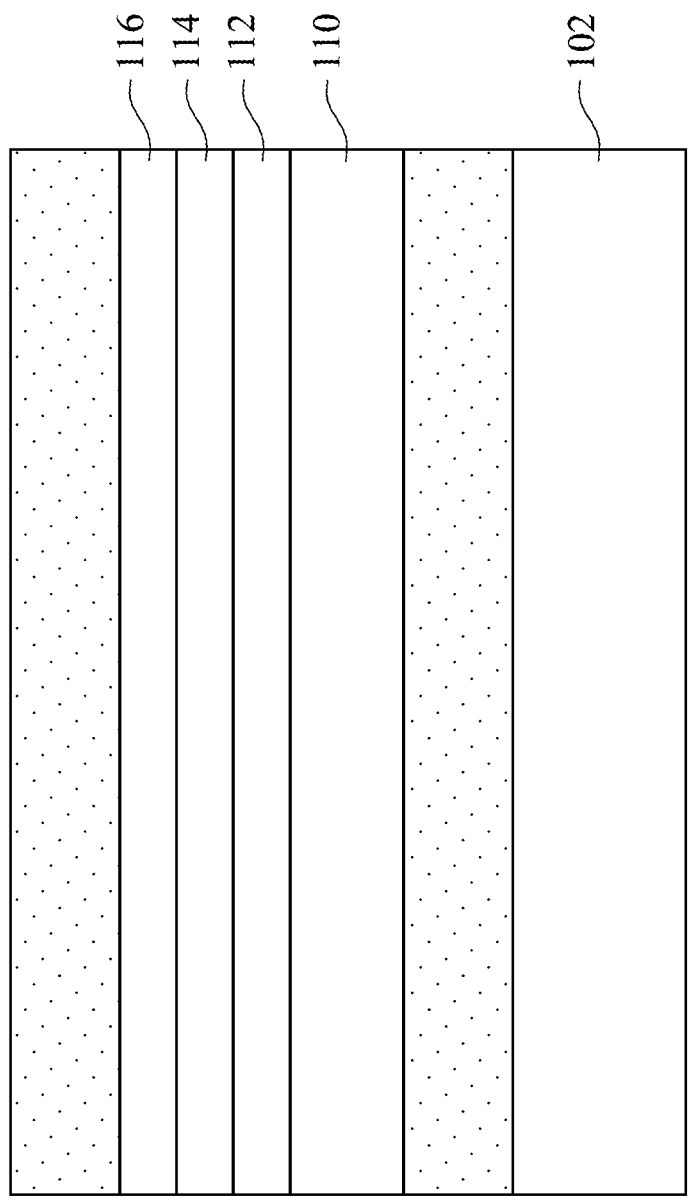
FIG. 6 is a cross-sectional view of a waveguide with the same cross-section as FIG. 1B according to a sixth embodiment of the present disclosure.

FIG. 6 is a cross-sectional view of a waveguide 100F with the same cross-section as FIG. 1B according to a sixth embodiment of the present disclosure. The difference between the present embodiment and the fifth embodiment is that the stacking order of the dielectric layers of the waveguide 100E is changed. The dielectric layers disposed above the substrate 102 are the first dielectric layer 110, the second dielectric layer 112, the third dielectric layer 114, and the fourth dielectric layer 116 in sequence, in which the first dielectric layer 110 is the closest one to the substrate 102, and the first dielectric layer 110 is located between the substrate 102 and the second dielectric layer 112. Furthermore, the combination of the dielectric layers can be an asymmetric structure as well.

Figure 7A:
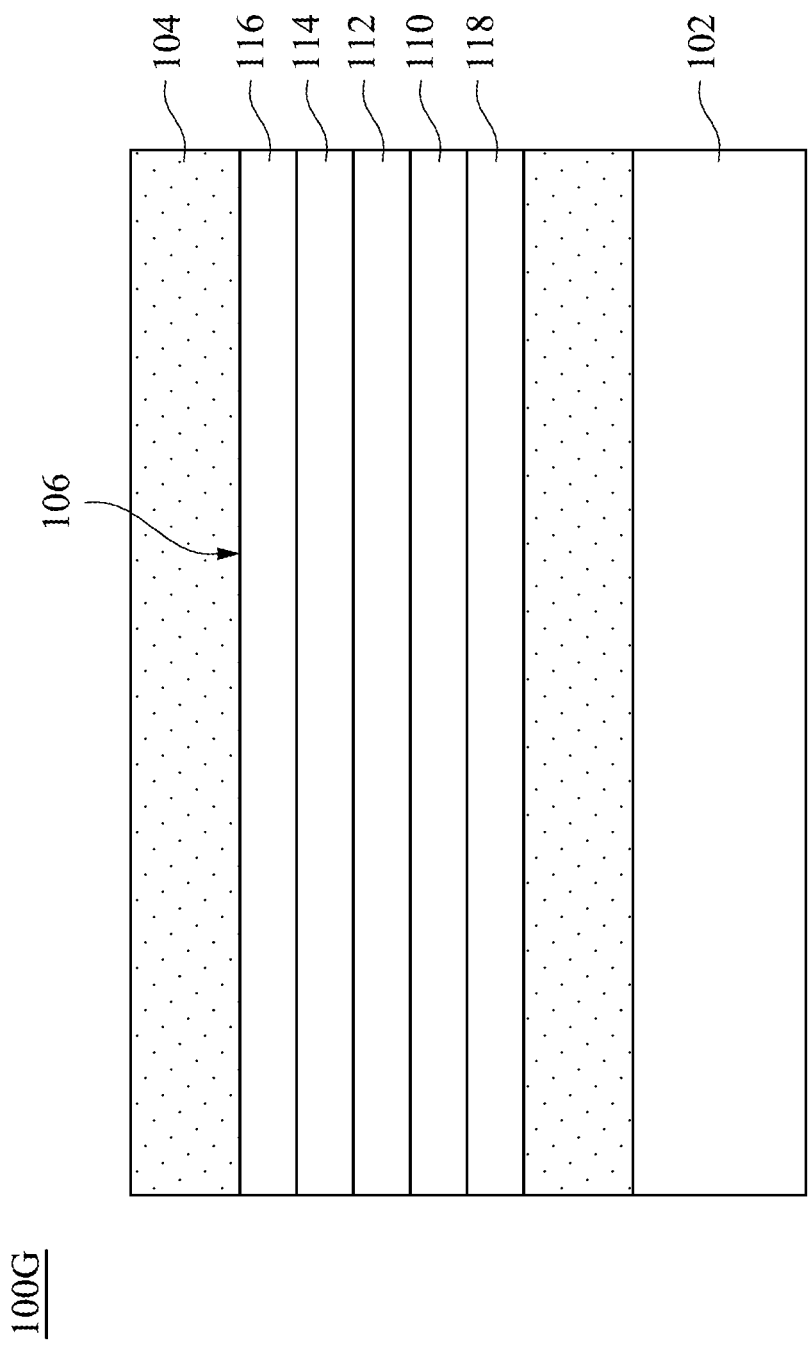
FIG. 7A is a cross-sectional view of a waveguide with the same cross-section as FIG. 1B according to a seventh embodiment of the present disclosure.
Figure 7B:
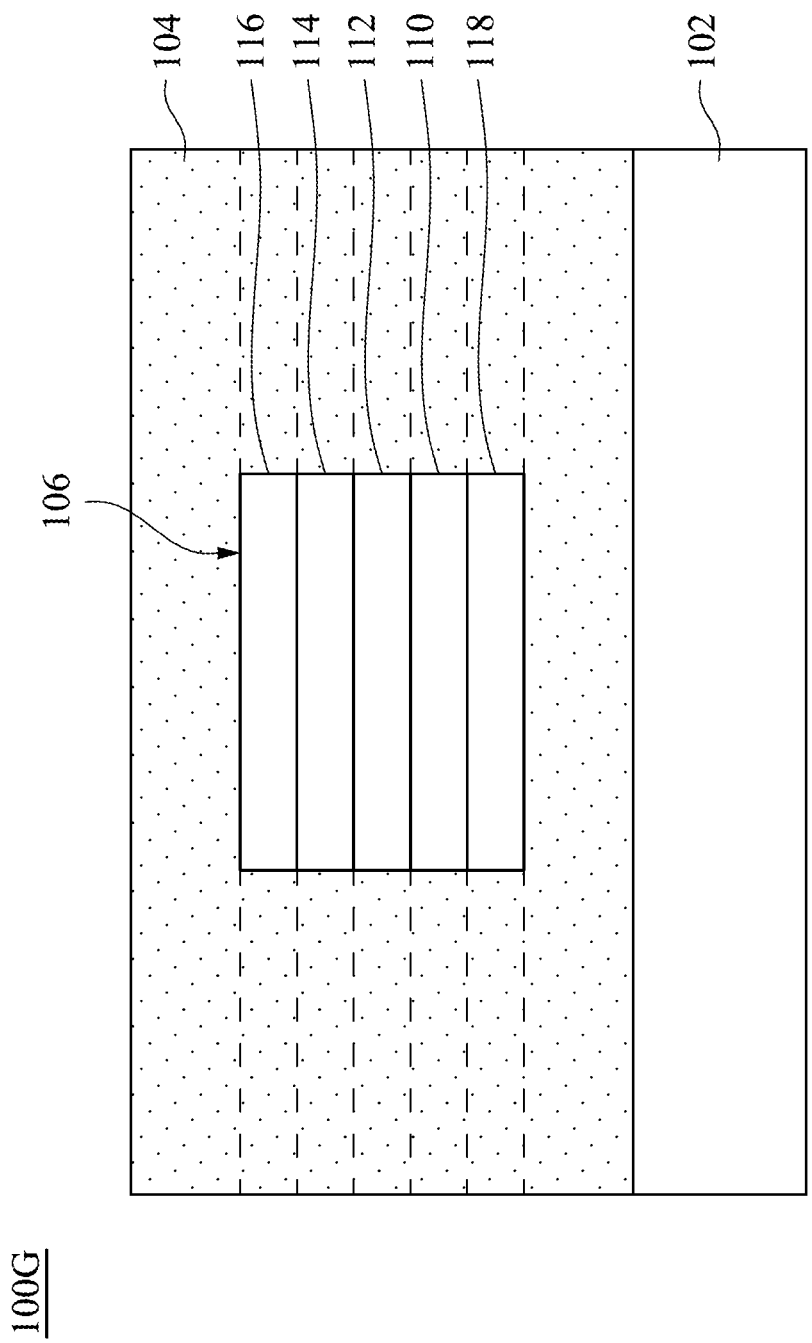
FIG. 7B is a cross-sectional view of the waveguide illustrated in FIG. 7A with the same cross-section as FIG. 1C.

FIG. 7A is a cross-sectional view of a waveguide 100G with the same cross-section as FIG. 1B according to a seventh embodiment of the present disclosure, and FIG. 7B is a cross-sectional view of the waveguide 100G illustrated in FIG. 7A with the same cross-section as FIG. 1C. The difference between the present embodiment and the first embodiment is that the waveguide 100G further includes a fourth dielectric layer 116 and a fifth dielectric layer 118 disposed in the tunnel 106, in which the fourth dielectric layer 116 is joined with third dielectric layer 114 and the fifth dielectric layer 118 is joined with the first dielectric layer 110. The third dielectric layer 114 is present between the second dielectric layer 112 and fourth dielectric layer 116, and the first dielectric layer 110 is present between the second dielectric layer 112 and fifth dielectric layer 118. The fourth dielectric layer 114 has a fourth refractive index N4 and the fifth dielectric layer 118 has a fifth refractive index N5, and N2>N1>N5 and N2>N3>N4. The second dielectric layer 112 is referred to as the core layer. In addition, the first refractive index N1 may be different from the third refractive index N3, and the fourth refractive index N4 may be different from the fifth refractive index N5. The dielectric layers disposed above the substrate 102 are the fifth dielectric layer 118, the first dielectric layer 110, the second dielectric layer 112, the third dielectric layer 114, and the fourth dielectric layer 116 in sequence, in which the fifth dielectric layer 118 is the closest one to the substrate 102, and the fifth dielectric layer 118 is disposed between the substrate 102 and the first dielectric layer 110.

Similarly to the first embodiment, the vertical projections of the first dielectric layer 110, the second dielectric layer 112, and the third dielectric layer 114 and vertical projections of the fourth dielectric layer 116 and the fifth dielectric layer 118 on the substrate 102 are the same, and a combination of the first dielectric layer 110, the second dielectric layer 112, and the third dielectric layer 114, the fourth dielectric layer 116, and the fifth dielectric layer 118 is embedded in the combination of the cladding layers 104. Furthermore, the fourth dielectric layer 116 and the fifth dielectric layer 118 are respectively in contact with the cladding layers 104 made of metal.

Figure 8:
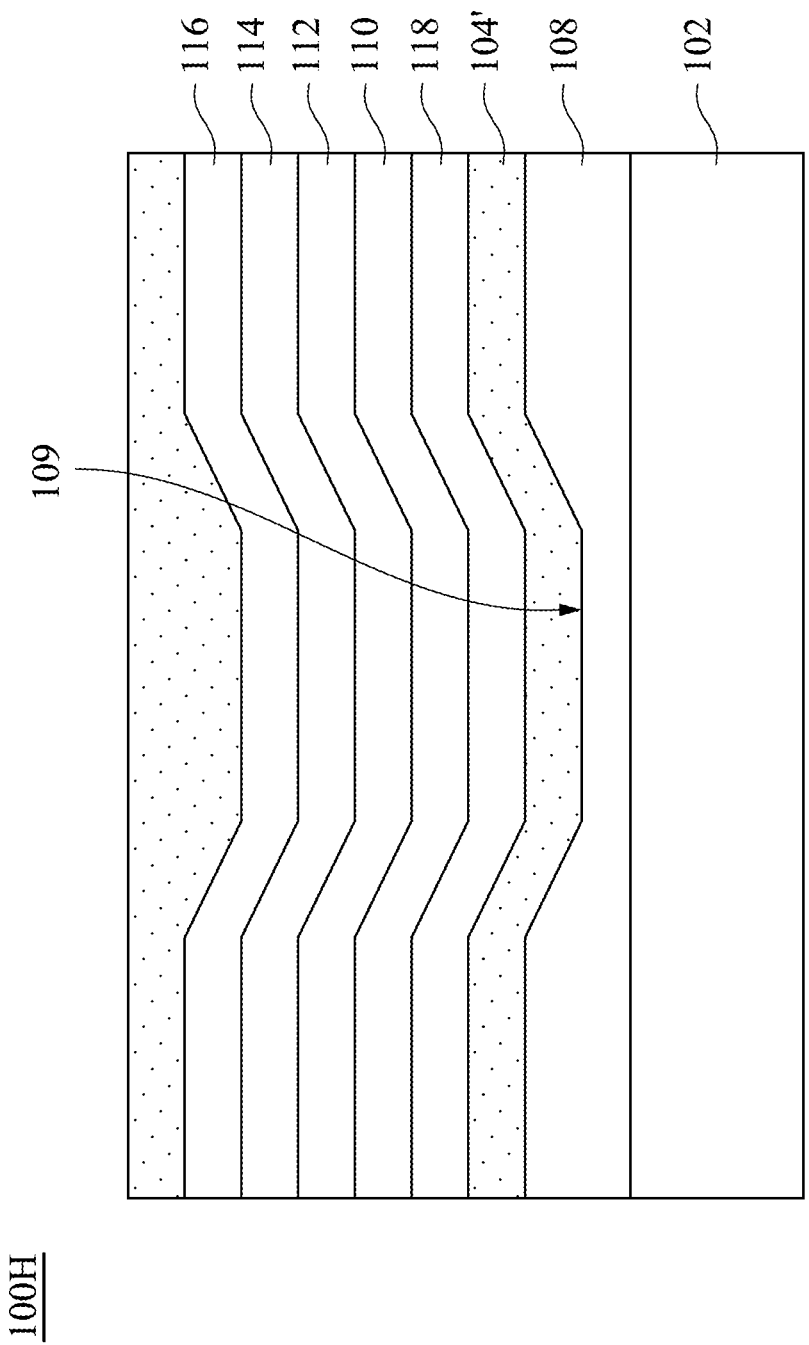
FIG. 8 is a cross-sectional view of a waveguide with the same cross-section as FIG. 1B according to an eighth embodiment of the present disclosure.

FIG. 8 is a cross-sectional view of a waveguide 100H with the same cross-section as FIG. 1B according to an eighth embodiment of the present disclosure. The difference between the present embodiment and the seventh embodiment is that the waveguide 100H of the present embodiment further includes an insulator layer 108 which is similar to the insulator layer 108 illustrated in FIG. 2.

As shown FIG. 8, similarly to the second embodiment, since the existence of the concave 109 of the insulator layer 108, the shapes of cladding layer 104' and a combination of the first dielectric layer 110, the second dielectric layer 112, and the third dielectric layer 114, the fourth dielectric layer 116, and the fifth dielectric layer 118 disposed in the tunnel 106 may be varied as well. For example, a portion of the fifth dielectric layer 118 protrudes toward the substrate 102, and the first dielectric layer 110, the second dielectric layer 112, the third dielectric layer 114, and fourth dielectric layer 116 are conformal to the fifth dielectric layer 118. Thus, the combination of the dielectric layers in the present embodiment can be referred to as a broken-line-shaped channel.

Figure 9:
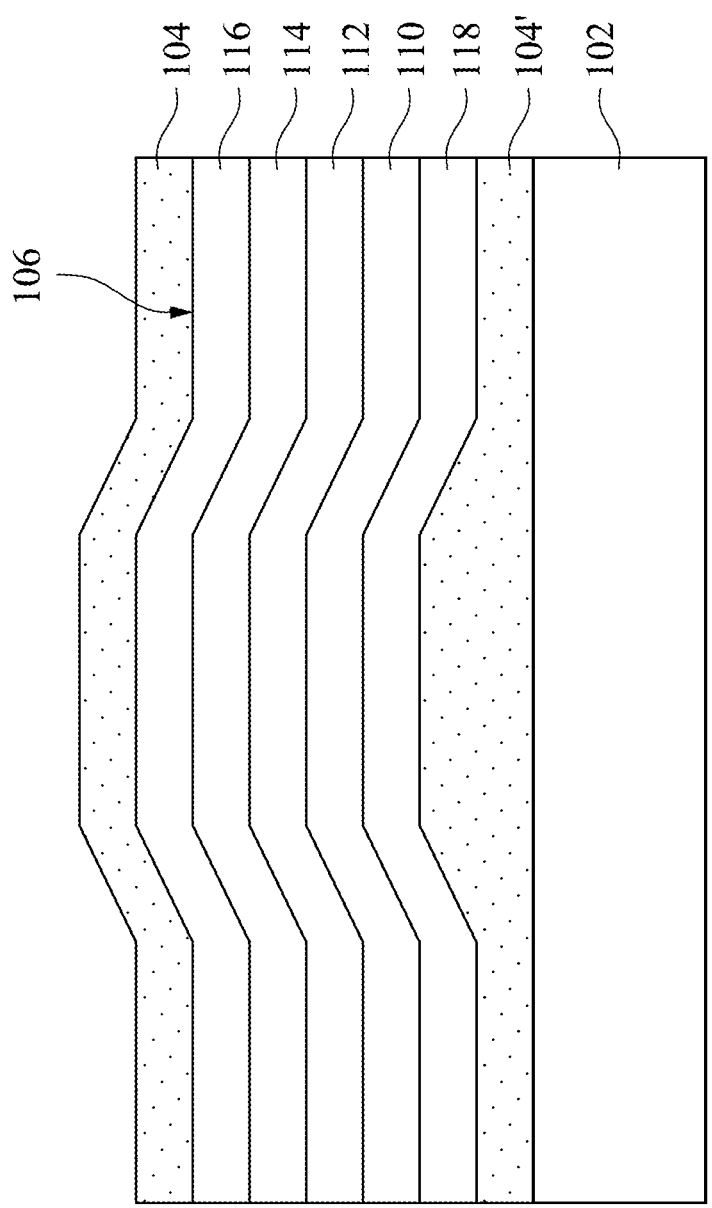
FIG. 9 is a cross-sectional view of a waveguide with the same cross-section as FIG. 1B according to a ninth embodiment of the present disclosure.

FIG. 9 is a cross-sectional view of a waveguide 100I with the same cross-section as FIG. 1B according to a ninth embodiment of the present disclosure. The difference between the present embodiment and the seventh embodiment is that one of the cladding layers 104 of the present embodiment protrudes toward the tunnel 106 and away from the substrate 102, such as the cladding layer 104', in which the cladding layer 104' is present between the substrate 102 and the fifth dielectric layer 118.

As shown in FIG. 9, since the cladding layer 104' protrudes toward the tunnel 106 and away from the substrate 102, the shape of the combination of the dielectric layers disposed in the tunnel 106 may be varied. For example, a portion of the fifth dielectric layer 118 protrudes away from the substrate 102, and the first dielectric layer 110, the second dielectric layer 112, the third dielectric layer 114, and the fourth dielectric layer 116 are conformal to the fifth dielectric layer 118. Thus, the combination of the dielectric layers in the present embodiment can be referred to as a broken-line-shaped channel.

Figure 10:
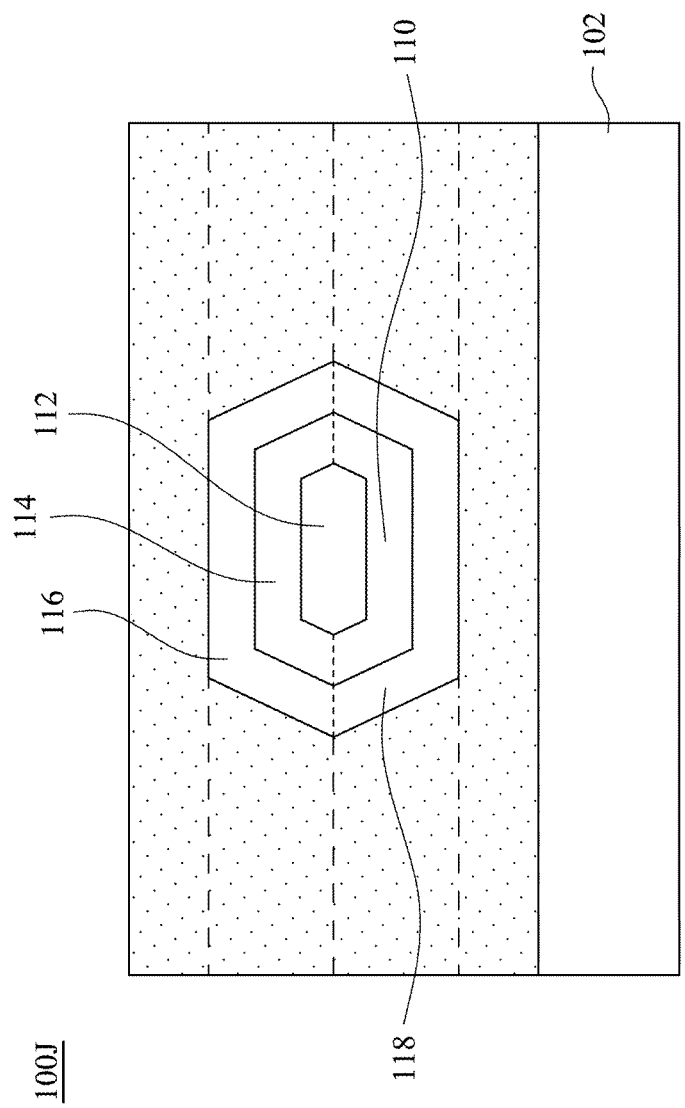
FIG. 10 is a cross-sectional view of a waveguide with the same cross-section as FIG. 1C according to a tenth embodiment of the present disclosure.

FIG. 10 is a cross-sectional view of a waveguide 100J with the same cross-section as FIG. 1C according to a tenth embodiment of the present disclosure. The difference between the present embodiment and the seventh embodiment is that a combination of the first dielectric layer 110, the second dielectric layer 112, and the third dielectric layer 114, the fourth dielectric layer 116, and the fifth dielectric layer 118 of the waveguide 100J is formed in an annular shape.

As shown in FIG. 10, the first dielectric layer 110 and the third dielectric layer 114 are connected with each other and the fourth dielectric layer 116 and the fifth dielectric layer 118 are connected with each other, in which an interface between the first dielectric layer 110 and the third dielectric layer 114 and another interface between the fourth dielectric layer 116 and the fifth dielectric layer 118 are shown as dot lines. In some embodiments, these interfaces are distinguishable. In alternative embodiments, there are no distinguishable interfaces among these dielectric layers. The second dielectric layer 112 is surrounded by the first dielectric layer 110 and the third dielectric layer 114, and thus the side surface of the second dielectric layer 112 is totally covered with the dielectric layers which have refractive indexes lower than that of the second dielectric layer 112. The second dielectric layer 112 can be referred to as a core channel therein. In addition, the first dielectric layer 110, the second dielectric layer 112, and the third dielectric layer 114 are surrounded by the fourth dielectric layer 116 and the fifth dielectric layer 118.

In aforementioned embodiments, the waveguide includes the cladding layers and the dielectric layers, in which the dielectric layers are disposed in the tunnel defined by the cladding layers. In the combination of the dielectric layers, the dielectric layer which has the greatest refractive index is referred to as the core layer. With the decreasing gradient of the refractive indexes from the core layer, the horizontal component of the traveling direction of the light beam traveling in the waveguide is increased. Therefore, the optical path of the light beam can be shortened, and the number of the reflections of the light beam with respect to the combination cladding layers is decreased. In the other hand, the ratio of the valid path to the total path of the light beam is increased. Accordingly, the transmission efficiency of the waveguide is enhanced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of the present disclosure provided they fall within the scope of the following claims.

What is claimed is:

1. A waveguide, comprising:
  a substrate;
  a plurality of cladding layers present on the substrate and defining at least one tunnel therein, at least one of the cladding layers being made of metal;
  a first dielectric layer disposed in the tunnel and having a first refractive index N1;
  a second dielectric layer disposed in the tunnel and having a second refractive index N2; and
  a third dielectric layer disposed in the tunnel and having a third refractive index N3, and N2>N1 and N2>N3, wherein the second dielectric layer is present between the first and third dielectric layers, wherein at least one of the cladding layers is present between the substrate and the first dielectric layer and protrudes toward the tunnel and away from the substrate, a portion of the first dielectric layer protrudes away from the substrate, and the second and third dielectric layers are conformal to the first dielectric layer.

2. The waveguide of claim 1, wherein the first and third dielectric layers are respectively in contact with the cladding layers made of metal.

3. The waveguide of claim 1, further comprising:
  a fourth dielectric layer disposed in the tunnel, wherein the third dielectric layer is present between the second and fourth dielectric layers, wherein the fourth dielectric layer has a fourth refractive index N4, and N3>N4, wherein the fourth dielectric layer is conformal to the first dielectric layer.

4. A waveguide, comprising:
  a substrate;
  a plurality of cladding layers resent on the substrate and defining at least one tunnel therein, at least one of the cladding layers being made of metal;
  a first dielectric layer disposed in the tunnel and having a first refractive index N1;
  a second dielectric layer disposed in the tunnel and having a second refractive index N2;
  a third dielectric layer disposed in the tunnel and having a third refractive index N3 and N2>N1 and N2>N3, wherein the second dielectric layer is present between the first and third dielectric layers; and
  a fourth dielectric layer disposed in the tunnel, wherein the third dielectric layer is present between the second and fourth dielectric layers, wherein the fourth dielectric layer has a fourth refractive index N4, and N3>N4, wherein the first and fourth dielectric layers are respectively in contact with the cladding layers made of metal.

5. The waveguide of claim 3, wherein at least one of the first, second third and fourth dielectric layers has a thickness different from that of others of the first, second, third and fourth dielectric layers.

6. The waveguide of claim 3, further comprising:
a fifth dielectric layer disposed in the tunnel, wherein the first dielectric layer is present between the second and fifth dielectric layers, wherein the fifth dielectric layer has a fifth refractive index N5, and N1>N5, wherein the fifth dielectric layer is conformal to the first dielectric layer.

7. The waveguide of claim 6, wherein the fourth and fifth dielectric layers are respectively in contact with the cladding layers made of metal.

8. A waveguide, comprising:
a substrate;
a plurality of cladding layers present on the substrate and defining at least one tunnel therein, at least one of the cladding layers being made of metal;
a first dielectric layer disposed in the tunnel and having a first refractive index N1;
a second dielectric layer disposed in the tunnel and having a second refractive index N2;
a third dielectric layer disposed in the tunnel and having a third refractive index N3, and N2>N1 and N2>N3, wherein the second dielectric layer is present between the first and third dielectric layers; and
a fourth dielectric layer disposed in the tunnel, wherein the third dielectric layer is present between the second and fourth dielectric layers, wherein the fourth dielectric layer has a fourth refractive index N4, and N3>N4; and
a fifth dielectric layer disposed in the tunnel, wherein the first dielectric layer is present between the second and fifth dielectric layers, wherein the fifth dielectric layer has a fifth refractive index N5, and N1>N5, wherein the fourth and fifth dielectric layers are respectively in contact with the cladding layers made of metal, a portion of the fifth dielectric layer protrudes toward the substrate, and the first, second, third and fourth dielectric layers are conformal to the fifth dielectric layer.

9. A waveguide, comprising:
a substrate;
a plurality of cladding layers present on the substrate and defining at least one tunnel therein, at least one of the cladding layers being made of metal;
a first dielectric layer disposed in the tunnel and having a first refractive index N1;
a second dielectric layer disposed in the tunnel and having a second refractive index N2;
a third dielectric layer disposed in the tunnel and having a third refractive index N3, and N2>N1 and N2>N3, wherein the second dielectric layer is present between the first and third dielectric layers; and
a fourth dielectric layer disposed in the tunnel, wherein the third dielectric layer is present between the second and fourth dielectric layers, wherein the fourth dielectric layer has a fourth refractive index N4, and N3>N4; and
a fifth dielectric layer disposed in the tunnel, wherein the first dielectric layer is present between the second and fifth dielectric layers, wherein the fifth dielectric layer has a fifth refractive index N5, and N1>N5, wherein the fourth and fifth dielectric layers are respectively in contact with the cladding layers made of metal, wherein the first dielectric layer and the third dielectric layer are connected to surround the second dielectric layer, and the fourth dielectric layer and the fifth dielectric layer are connected to surround the first, second and third dielectric layers.

10. The waveguide of claim 6, wherein at least two of the first, second, third, fourth and fifth dielectric layers have different thicknesses.

11. A waveguide, comprising:
a substrate;
a plurality of cladding layers present on the substrate and defining at least one tunnel therein, at least one of the cladding layers being made of metal;
a first dielectric layer disposed in the tunnel and having a first refractive index N1;
a second dielectric layer disposed in the tunnel and having a second refractive index N2;
a third dielectric layer disposed in the tunnel and having a third refractive index N3, and N2>N1 and N2>N3, wherein the second dielectric layer is present between the first and third dielectric layers; and
a fourth dielectric layer disposed in the tunnel wherein the third dielectric layer is present between the second and fourth dielectric layers, wherein the fourth dielectric layer has a fourth refractive index N4, and N3>N4; and
a fifth dielectric layer disposed in the tunnel, wherein the first dielectric layer is present between the second and fifth dielectric layers, wherein the fifth dielectric layer has a fifth refractive index N5, and N1>N5, wherein the first refractive index N1 is different from the third refractive index N3, and the fourth refractive index N4 is different from the fifth refractive index N5.

12. The waveguide of claim 8, further comprising:
an insulator layer disposed between the substrate and one of the cladding layers, wherein the insulator layer has a concave that receives a portion of the cladding layer.

13. The waveguide of claim 1, wherein at least one portion of the tunnel has a extending direction, and the extending direction of the tunnel is substantially parallel with a surface of the substrate proximal to the cladding layers.

14. The waveguide of claim 1, wherein the substrate consists of silicon, and the first dielectric layer, the second dielectric layer, and the third dielectric layer are made of silicon dioxide or transparent material.

* * * * *